Aug. 5, 1952      A. W. BREWER ET AL      2,606,229
APPARATUS FOR THE MEASUREMENT OF MAGNETIC FIELDS
Filed Oct. 28, 1949      7 Sheets-Sheet 1

INVENTORS
Alan West Brewer &
BY Charles Alfred Jarman

Flocks and Simon
ATTORNEYS

Aug. 5, 1952   A. W. BREWER ET AL   2,606,229
APPARATUS FOR THE MEASUREMENT OF MAGNETIC FIELDS
Filed Oct. 28, 1949   7 Sheets-Sheet 2

INVENTORS
Alan West Brewer
BY Charles Alfred Jarman
Hocks and Simon
ATTORNEYS

UNITED STATES PATENT OFFICE 2,606,229

APPARATUS FOR THE MEASUREMENT OF MAGNETIC FIELDS

Alan West Brewer, Oxford, and Charles Alfred Jarman, Westminster, London, England Application October 28, 1949, Serial No. 124,218
In Great Britain October 28, 1948

8 Claims. (Cl. 175—182)

This invention concerns apparatus for the determination of the configuration of the earth's magnetic field, both in intensity and direction, and has for an object to provide apparatus which is particularly, although not exclusively, suitable for aerial geomagnetic survey and which avoids the necessity for accurate determination during flight of a constant direction, such as the North-South line, and of angles with respect thereto. Although it is possible in an aircraft in flight to determine a fixed direction and to measure angles wtih respect thereto, it is well known that the accuracy of such measurements cannot be held with any degree of certainty to within the small limits such as are required in geomagnetic surveying. Aerial geomagnetic survey apparatus operating on the principle of determining a fixed direction and making measurements of field intensity therealong has been used, but it has usually suffered from the limitations of accuracy noted above, and also from complexities of construction, operation and maintenance of the airborne equipment.

The present invention aims at overcoming the above limitations of accuracy and also at simplifying the airborne equipment necessary for making aerial geomagnetic surveys.

A further object of the invention is the provision of a technique and apparatus whereby measurements of field strength may be made directly in terms of absolute values.

In the method of aerial geomagnetic survey to which the invention is most advantageously applied, a continuous record is taken of the position of the surveying aircraft, the value of the earth's total field, and the values of components of the earth's field in two known directions. From these data, accurate determinations can be made of the intensity and direction of the earth's magnetic field at any given point in an area which has been surveyed. The invention is primarily concerned with the delineation of one of the said known directions in a manner which is substantially free from the objections hitherto encountered.

Briefly stated, the invention consists in the selection of a heavenly body, such as the sun or a star, to define at least one of the known directions in which measurements of a component of the earth's magnetic field are continuously made, this selection requiring that to the data appearing on the continuous record must be added a time calibration in order that the true direction of this component may be accurately computed from astronomical tables.

The apparatus according to the present invention for use in determining the earth's magnetic field in magnitude and direction comprises means for making simultaneous and continuous measurements on a moving vehicle of the magnitude of the total force of the field and of two components thereof in different known directions, at least one of which is the direction of a preselected heavenly body from the vehicle, and means for simultaneously and continuously recording the time and the position of the vehicle with respect to the earth's surface.

The invention also envisages the provision of apparatus comprising in combination a magnetometric device for measuring the earth's total magnetic field, a second magnetometric device for measuring a component thereof in a predetermined direction, a third magnetometric device, and means for maintaining the orientation of the third magnetometric device in the direction of a preselected heavenly body.

The said predetermined direction may be the vertical direction or the direction of another heavenly body.

According to a feature of the invention, the means for maintaining the orientation of the third magnetometric device comprises a telescope to be trained on the preselected heavenly body, light sensitive means responsive to departures of the axis of the telescope from the direction of the heavenly body for correcting deviations of the telescope from the required direction, and means for controlling the orientation of the third magnetometric device in accordance with movements of the telescope.

It is already known to provide apparatus for determining by aerial survey the locations of sudden changes in the earth's magnetic field for the purpose of detecting the presence of mineral deposits in the earth's crust. The results of such a survey, however, have only indicated the relative values and the locations of such changes, and have not indicated either the true magnitude or the direction of the earth's magnetic field at all points in an area surveyed. This latter information is required for a variety of purposes, such as navigation by magnetic compass, and is, moreover, of a kind which is variable so that surveys must be made of the same area from time to time in order to ascertain whether, and if so to what extent, the earth's magnetic field has changed at any point in that area.

The invention accordingly aims further at providing apparatus whereby this disadvantage may be overcome, and thus enable accurate determinations to be made of the true configuration of the earth's (or any ambient) magnetic field.

The invention provides means for measuring an ambient magnetic field comprising a fluxgate having an open core of high permeability magnetic material, an energising winding on the core for connection to an alternating current supply and having a sufficient number of turns to cause saturation of the core over the greater part of each half cycle of the supply, and negative feed-back means controlled by the output of the fluxgate for opposing the ambient field along the fluxgate axis.

Preferably, a fluxgate comprises two similar open cores of high permeability magnetic material mounted in close parallel relationship and having their energising windings connected in series so as to produce in the respective cores magnetic fields of equal magnitude and opposite sense.

Advantageously, a core consists of a bundle of thin wires each of the same length as the core, and a rigid non-magnetic sheath enclosing the said wires and around which is wound the energising winding.

In the following description of aerial geomagnetic survey equipment (which is to be understood as illustrative only of the invention) use is made of a known form of magnetometer for the determination of the earth's total magnetic field, together with two separate magnetometer assemblies, one of which measures, for recording on the chart, the vertical component of the earth's magnetic field, whilst the other measures, also for recording on the chart, the component of the earth's magnetic field in the direction of the sun in relation to the aircraft in which the equipment is mounted. The latter assembly includes a telescope or like optical system which is automatically held aligned with the sun.

The known form of magnetometer referred to above by which the value of the total force of the earth's magnetic field is measured consists essentially of three fluxgates rigidly mounted in a gimbal ring assembly with their magnetic axes mutually perpendicular. Two of the fluxgates control servo mechanisms which are coupled to the respective rings of the gimbal mounting, and are operative to adjust the said rings in the sense for maintaining the axes of the two control fluxgates perpendicular to the direction of the ambient magnetic field. The axis of the third or measuring fluxgate is then maintained coincident with the direction of the ambient field, and the output from this measuring fluxgate is proportional to the value of the earth's total field. Since this apparatus is well known per se, it is not thought necessary to describe it in further detail.

The apparatus for measuring the vertical component of the earth's magnetic field comprises a second magnetometer assembly having a fluxgate rigidly secured to a pendulum so that its axis remains parallel to the length of the pendulum. The latter is freely supported from the aircraft structure. The vertical fluxgate thus measures the component of the earth's field in the vertical direction, and these measurements when averaged out over a relatively long period of time, such as several minutes, are substantially independent of any errors in the attitude of the pendulum arising from random accelerations of the aircraft.

The strength of the component of the earth's magnetic field in the direction of a heavenly body is determined by a third magnetometer assembly comprising a fluxgate having its magnetic axis accurately parallel to the axis of a telescope carried in a gimbal mounting within an astrodome on the aircraft. The telescope is trained on a selected heavenly body, such as the sun, and has associated therewith control mechanism for maintaining the axis of the telescope accurately aligned in the direction of the heavenly body.

With the apparatus described above is associated an accurate chronometer for determining the time calibration of the chart and a convenient form of known device for determining and recording on the chart the latitude and longitude of the aircraft at any instant. Such a device may be constituted by a radar lattice navigation system operating, for example, on the existing Gee navigation aid system. Alternatively, where the survey is being made over land, continuous photographic recording of the aircraft's position may be made for subsequent determination of its position from ground maps. The results obtained from the magnetometer associated with the solar telescope can subsequently be computed from astronomical tables and from accurate knowledge of the aircraft's position at any given time. In this way, the required data concerning the earth's magnetic field are obtained.

The record of a survey made in this manner thus provides sufficient data for obtaining an accurate determination of the absolute values of the strength of the earth's magnetic field and its direction at all points of the earth's surface in the area covered by the survey. The earth's field can thus be accurately mapped with great rapidity compared with previously known methods.

Alternative practical embodiments of the invention, which are illustrative only thereof, will now be described with reference to the accompanying drawings in which.

Figure 1:
Figs. 1-4 illustrate successive stages in the manufacture of a fluxgate element.
Figure 2:
Figure 3:

Figs. 1-4 of the drawings illustrate the construction of a fluxgate according to the present invention. Each fluxgate consists essentially of an open high permeability magnetic core around which is wound an A. C. energising winding extending over the full length of the core. A relatively narrow bore fused slica tube 1 is first sealed at one end 1a (see Fig. 1). Into the tube 1 is then inserted a bundle of small diameter straight drawn wires 2 (Fig. 2) of a material having a high magnetic permeability and whose B—H curve exhibits a sharp knee at the saturation point. After insertion of the bundle of wires 2 into the tube 1, the free space within the tube is filled with silica powder 3 (Fig. 3), and the open end 1b of the tube 1 is then sealed, for example, by means of an oxy-acetylene torch. The whole assembly is then heat-treated at about 1050° C. for two hours to anneal the wires 2 which constitute the magnetic core, the tube 1 forming a protective sheath against oxidation and mechanical damage.

Such a construction of magnetic core element has the desirable property that it possesses no significant residual magnetism, which permits absolute measurements of ambient field to be made. This property arises from the use of very thin magnetic material 2, which ensures that skin effect does not prevent the energising field from penetrating to and saturating all parts of the core. Normally, however, the core 2 alone would have insufficient mechanical strength to resist the stresses of normal usage, and the fused silica tube 1 provides the necessary degree of ruggedness and protects the core material from local hardening due to mechanical working by bending. After annealing, a winding 4 (Fig. 4) is placed around the outside of the tube 1 for the full length of the core 2. Two such fluxgates are then rigidly connected together in parallel relationship and have their windings connected in series so that when a current is passed therethrough the cores 2 are magnetised in opposite directions. Each fluxgate has the same number of turns in the energising winding, and these are selected so that the ampere turns are sufficient to drive the iron 2 of the core into saturation for the greater part of each half cycle of the alternating current supply.

When a fluxgate is energised by a current through the driving winding 4 of a magnitude sufficient to drive the core 2 to saturation, a sharp discontinuity appears in each half-cycle of the voltage waveform. If two identical fluxgates have their driving windings connected in series to form two arms of a bridge circuit across the supply, and if for zero ambient field conditions the bridge is balanced, their voltages will oppose each other so that there is no output. By introducing a phase unbalance in the bridge, however, this mutual voltage cancellation can be modified so that, for zero ambient field conditions, the discontinuities occur at different instants, and an output consisting of alternately positive and negative voltage peaks of equal height is obtained. If now the fluxgates are subjected to an ambient field of constant level, the discontinuities in the voltage waveforms are further shifted with respect to each other and result in a proportional increase in height of the alternate peaks and a proportional decrease in height of the intermediate voltage peaks. If the direction of the field is reversed, the relative peak heights are also reversed, so that the arrangement provides a means for measuring the magnitude and direction of the ambient field.

In an alternative technique, use is made of the fact that, for zero ambient field, there are no even harmonics in the voltage waveform of a fluxgate, but when an ambient field is applied, a pronounced second harmonic appears. The magnitude of this harmonic is proportional to the intensity of the ambient field, whilst its phase with respect to the fundamental driving frequency is dependent on the direction of the ambient field. Thus, an alternative method of measuring an ambient field is provided.

Figure 5:
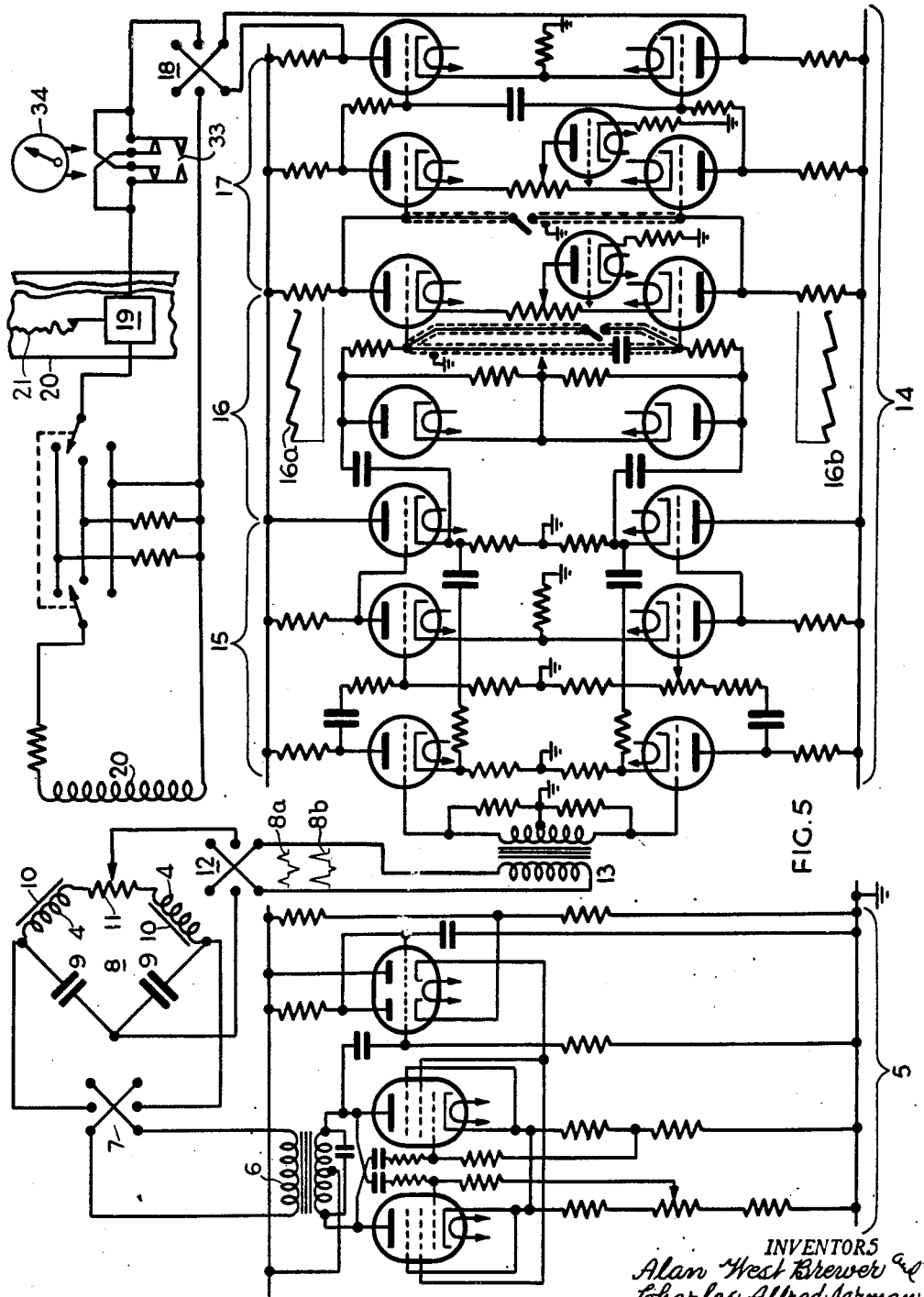
Figs. 5 and 6 show alternative circuits for a magnetometer arrangement embodying a fluxgate constructed in the manner shown in Figs. 1-4.

A circuit arrangement for operating on peak heights is illustrated in Fig. 5 of the drawings. In this circuit, an oscillator 5 of normal design is arranged to give a symmetrical output from an output transformer 6 which is connected, through a reversing switch 7, to a bridge circuit 8 comprising two substantially equal condensers 9 connected in series across the supply and two fluxgate elements 10 whose windings 4 constitute the other two arms of the bridge and are connected in series through a balance adjusting resistance 11.

The output from this bridge 8 is fed through a second reversing switch 12 to an input transformer 13 of a symmetrical amplifier indicated generally at 14. This amplifier consists of three successive stages 15, 16 and 17. The stage 15 is a pulse amplifier, whilst the stage 16 is a peak rectifier. Stage 17 is a D. C. amplifier. The output from the amplifier stage 17 is fed through a reversing switch 18 to a pen recorder 19, and to a magnetic feedback coil 20 which embraces the two fluxgates so that its magnetic axis is coincident with the resultant magnetic axis of the fluxgate unit. This feedback coil is arranged so that it "backs off" a large proportion of the ambient magnetic field, the reversing switches 12 and 18 being ganged to ensure that the field of the feedback coil 20 is always in the correct sense.

For the condition of zero ambient field, the output from the fluxgate bridge 8 consists of alternate positive and negative peaks of equal height, as shown in the waveform at 8a. These are simultaneously amplified in both sides of the A. C. amplifier stage 15 and appear at the output of the peak rectifier stage 16 as equal and opposite voltages having a waveform as shown at 16a, 16b. The output from the D. C. amplifier stage 17, which is proportional to the difference between the outputs of the peak rectifier stage 16, is therefore zero for zero ambient field at the fluxgates 10, and no feedback current flows in the coil 20.

If now an ambient field is applied to the fluxgate 10, a difference in peak heights appears in the output from the bridge 8, and the waveform is as indicated at 8b. The positive peaks are now larger than the negative peaks, indicating that the ambient field is in the positive direction and has an intensity proportional to the difference in height of the peaks. These are amplified in the respective halves of the A. C. amplifier stage and appear in the output of the peak rectifier stage 16 as voltages of opposite polarity having similar waveforms of the shape shown at 16a, 16b, respectively, but of unequal magnitude. The output of the D. C. amplifier stage 17 is thus proportional to this difference in magnitude which in turn is proportional to the difference in magnitude of the positive and negative peaks in the waveform 8b. The feedback coil 20 thus has a current fed thereto which produces a flux almost equal to the intensity of the ambient field, so that the current supplied to the recorder 19 is always a function of the ambient field, and the record 21 obtained on the moving chart 22 is a direct indication of the absolute value of the ambient field.

Figure 6:
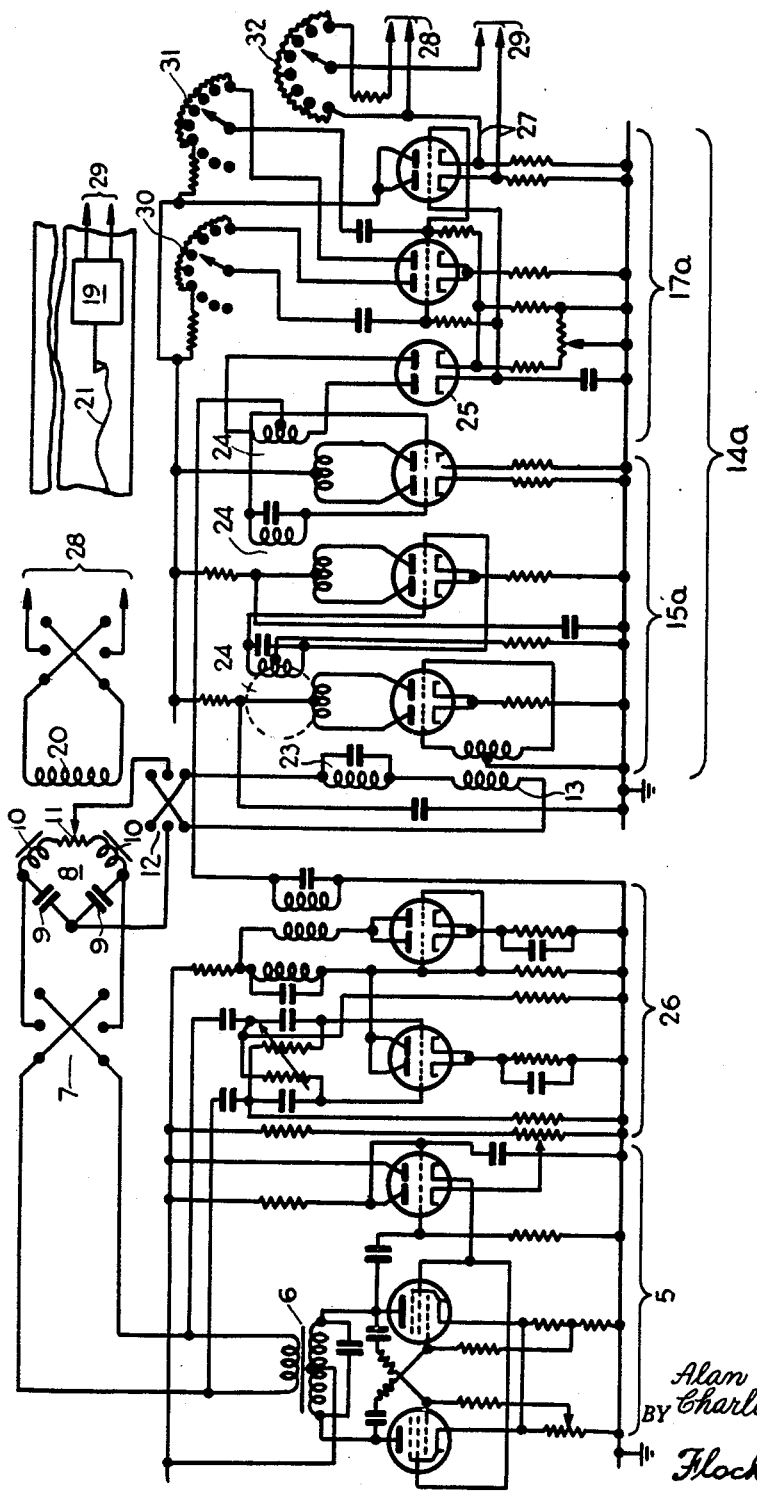

The alternative circuit arrangement illustrated in Fig. 6 is based on the fact that when the fluxgates 10 are in zero field, there are no even harmonics in the output from the bridge 8. When, however, the fluxgates 10 are subjected to an ambient field, even harmonics appear in the output from the bridge. Of these, the strongest is normally the second harmonic, the magnitude of which is proportional to the intensity of the ambient field. The bridge 8 is energised as in the previous figure by a symmetrical oscillator 5, and its output is fed to a symmetrical amplifier generally indicated at 14a by way of an input transformer 13 in series with which is connected a third harmonic rejector circuit 23. The first stage 15a of the amplifier 14a is an A. C. push-pull amplifier, the component stages of which are coupled by transformers 24 which are tuned to the second harmonic in the output from the bridge 8.

The A. C. amplifier stage 15a is followed by a double diode comparison stage 25 in which the output from the amplifier stage 15a is compared with the output from a frequency doubler stage 26 which is fed from the oscillator 5. The output from the double diode 25 is thus D. C. having an amplitude which is proportional to the intensity of the ambient field surrounding the fluxgates 10, and a polarity which is determined by the phase of the second harmonic component in the output from the bridge 8. This in turn is dependent on the direction of the ambient field so that the D. C. output from the D. C. amplifier stage 17a which follows the double diode 25 represents the ambient field in both magnitude and sense.

The output 27 from the D. C. amplifier stage 17a is divided to provide separate outputs 28 and 29 which are connected to the feedback coil 20 and recorder 19 respectively. It will be noted in passing that the D. C. amplifier stage 17a is provided with response time controls at 30 and 31, whilst a potential divider 32 is provided for varying the amount of feedback to the coil 20.

The field due to the feedback coil 20 is arranged to balance the ambient field to within the limits of accuracy required in the apparatus. In normal working conditions, the current through the feedback coil 20 has two components, one of which is derived from the amplifier 14 or 14a respectively, whilst the other is a direct current component of constant value which is derived from an independent source and whose magnitude is predetermined by trial and error. Thus, in order to deduce the absolute value of ambient field strength at the fluxgates 10, measurements must be taken of both these components. Provision is made, as shown at 33 in Fig. 5, for the connection of an indicating milliammeter 34 into the recorder circuit so that direct readings of the feedback component may be made at will.

Either the circuit of Fig. 5 or the circuit of Fig. 6 is used as desired in the three magnetometer assemblies already referred to.

Figure 7:
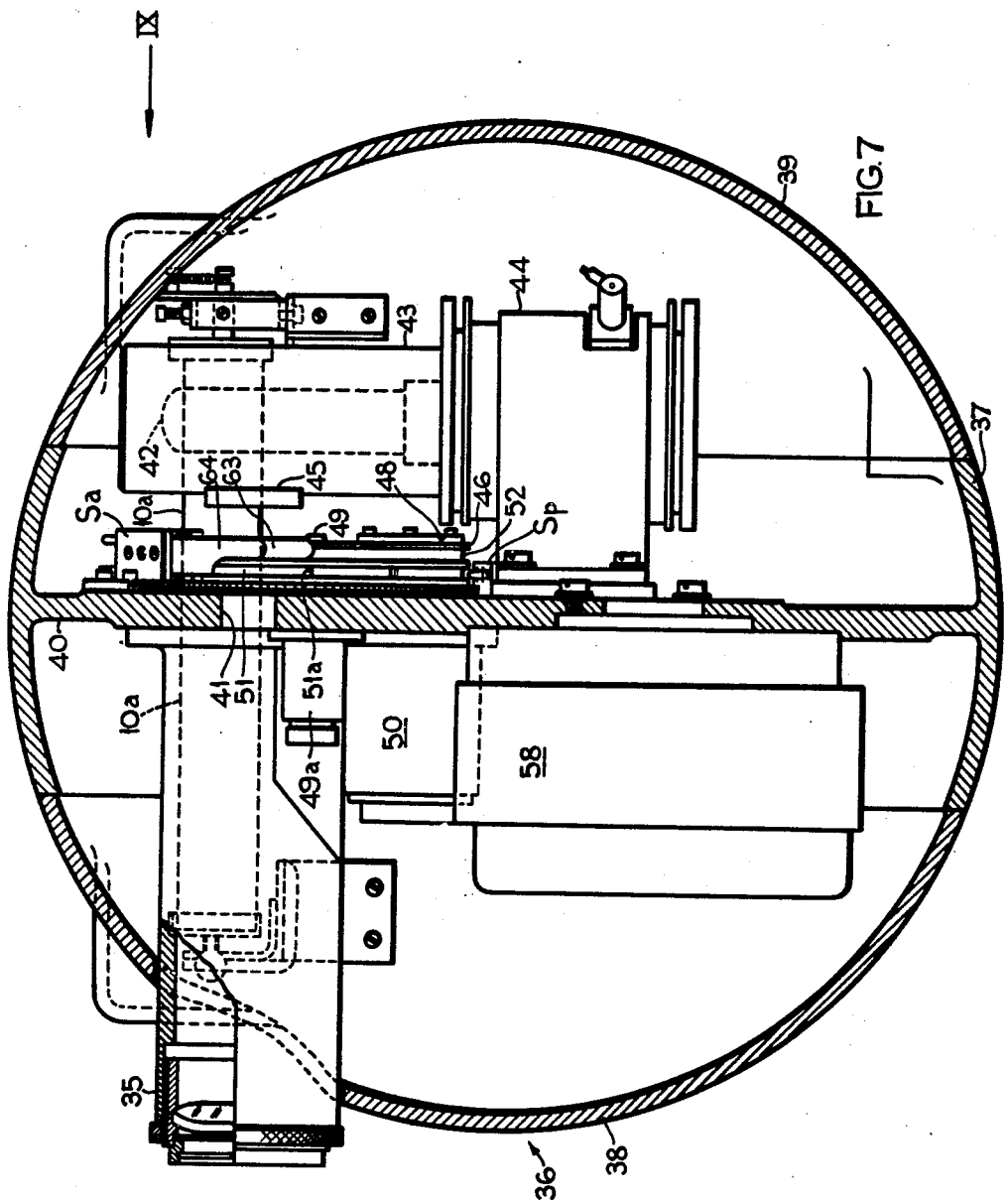
Fig. 7 is a vertical cross-section through an automatically following telescope.
Figure 8:
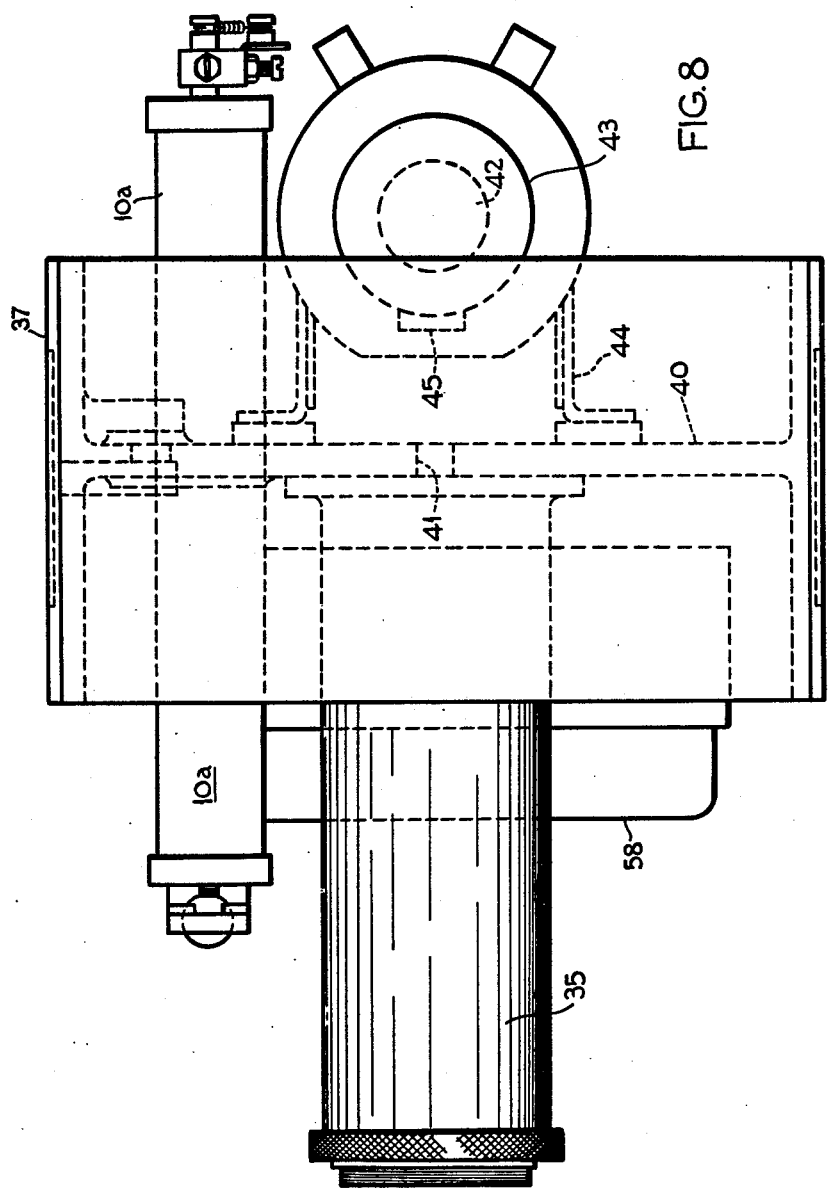
Fig. 8 is a plan view of Fig. 7 with parts of the housing removed.
Figure 9:
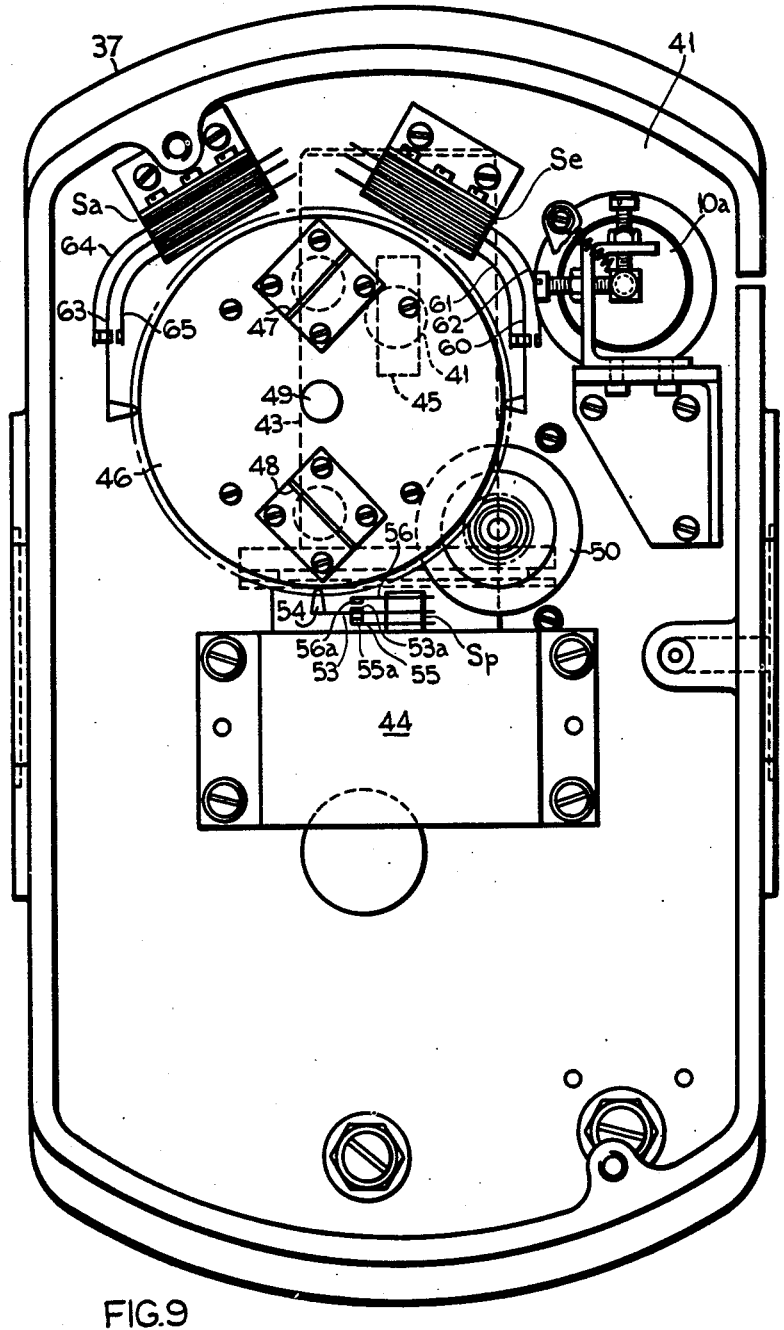
Fig. 9 is a view in the direction of the arrow IX (Fig. 7) with one end cover of the housing removed.

Figs. 7, 8 and 9 illustrate a construction of automatic following telescope for maintaining a fixed direction in space along which the component of the earth's magnetic field is to be measured. The arrangement is designed to ensure that this direction is accurately held irrespective of movements of the aircraft in which the apparatus is mounted, and consists of a telescope 35 which is mounted in a housing generally indicated at 36 which constitutes one ring of a gimbal mounting. The housing 36 consists of a central ring portion 37 having detachable end covers 38 and 39 for giving access to the telescope and its associated gear. The telescope 35 is mounted on a partition 40 which is integral with the central ring 37 of the housing 36, and projects through the end cover 38 of the housing. On the optical axis of the telescope, the partition 40 is provided with an aperture 41 through which light rays from an objective on which the telescope is trained are allowed to pass so as to impinge on a photocell 42 located within a light-proof housing 43 mounted on a bracket 44 on the opposite side of the partition 40. The housing 40 is provided with a rectangular aperture 45 which is aligned with the aperture 41 in the partition 40 so that light rays passing along the axis of the telescope may reach the photocell 42.

Figure 12:
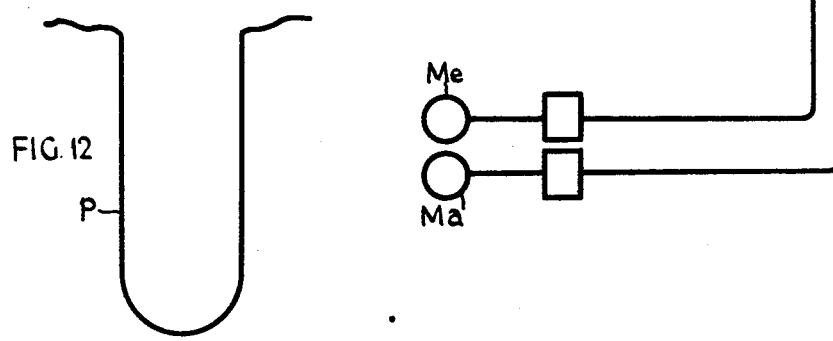
Figs. 12-17 are stylised waveforms of voltages occurring at several points of the circuit of Fig. 11.
Figure 13:
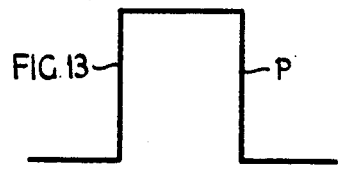
Figure 14:
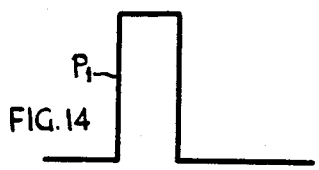
Figure 16:
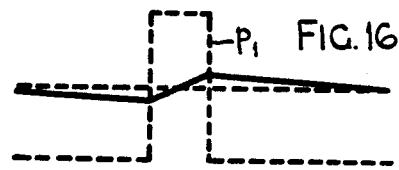

Between the apertures 41 and 45 in the partition 40 and photocell housing 43 respectively is mounted a shutter 46 in the form of an opaque disc having two diammetrically opposite narrow slits 47, 48 respectively. These slits are directed at 90° with respect to each other, and at 45° to a common diameter passing through their centres of length. The shutter disc 46 is mounted on a spindle 49 carried in a bearing 49a in the partition 40 which is so located with respect to the telescope axis that, when the shutter disc 46 is rotated by a constant speed motor 50 mounted on the partition 40, the slit 47 is traversed transversely of its length across the telescope aperture 41 in a vertical direction, whilst the slit 48 is similarly traversed thereacross in a horizonal direction. Thus, assuming that the telescope 35 is trained on the sun, the image of the disc thereof is scanned alternately in elevation and in azimuth. An output is thus derived from the photocell which consists of intermittent pulses of the shape shown in stylised manner at P in Fig. 12. These pulses are utilised, in a manner to be described, for correcting the direction of the axis of the telescope 35 in elevation and azimuth.

Figure 10:
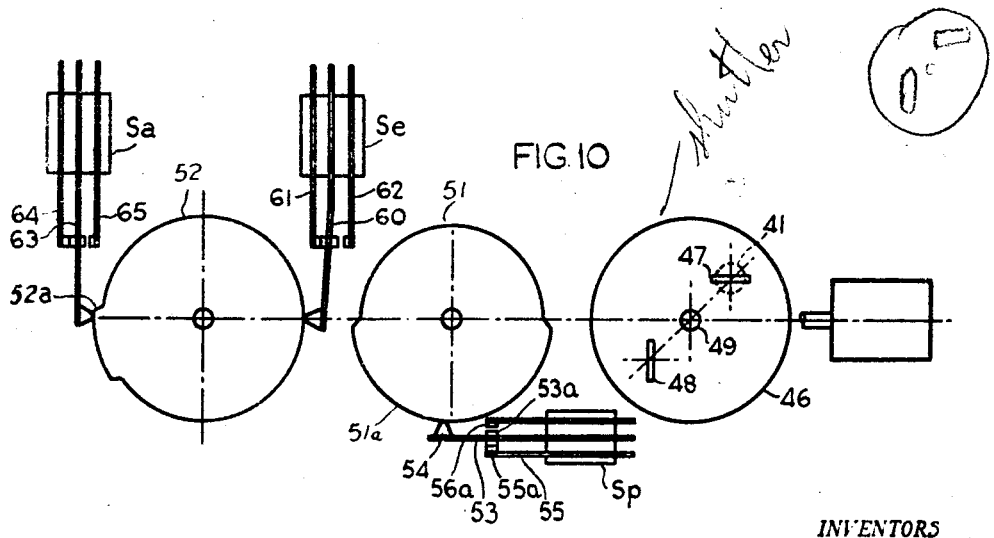
Fig. 10 is an exploded schematic layout of parts of the automatic following mechanism for the telescope.

Secured to the shutter disc 46 are two cams 51, 52 (see also Fig. 10). The cam 51 has a lift 51a which extends over 180° of the circumference of the cam, and a moving contact blade 53 of a change-over switch Sp is provided with a follower 54 which bears on the cam 51. Fixed contact blades 55, 56 are located on either side of the moving blade 53 and carry contacts 55a, 56a respectively which are alternately engaged by a contact 53a on the blade 53 according to whether the follower 54 is in engagement with the lift 51a or not. The lift 51a is arranged so that the contacts of the switch Sp change over at points mid-way between successive scans of the telescope aperture 41 by the slits 47, 48.

Similar change-over switches Sa, Se are associated with the cam 52. This cam has a short lift 52a having an arcuate length such as to subtend, at the axis of the spindle 49, an angle slightly greater than half the angular movement of the shutter 46 required to traverse either of the slits 47, 48 across the telescope aperture 41. The leading edge of the lift 52a is located so as to effect a change-over of the switch Se or Sa at the instant when the corresponding slit 47 or 48 is coincident with a diameter of the aperture 41. The arrangement is such that, as will be described more fully below, the output of the photocell 42 is chopped when a slit intersects the telescope axis, the portions of the said output before and after operation of the respective change-over switch Sa or Se being compared and any difference in duration of the chopped pulses being converted to a voltage and fed to a corresponding servo-motor Ma or Me (Fig. 11) in the sense for correcting misalignment of the telescope in azimuth or elevation respectively. The telescope is stabilised by a gyro 53 carried on the partition 40. A fluxgate 10a is rigidly mounted in the housing 36 with its axis parallel to that of the telescope 35 so that this fluxgate always has its axis in the direction of the heavenly body on which the telescope is trained so as to measure the component of the earth's magnetic field in that direction.

Figure 11:
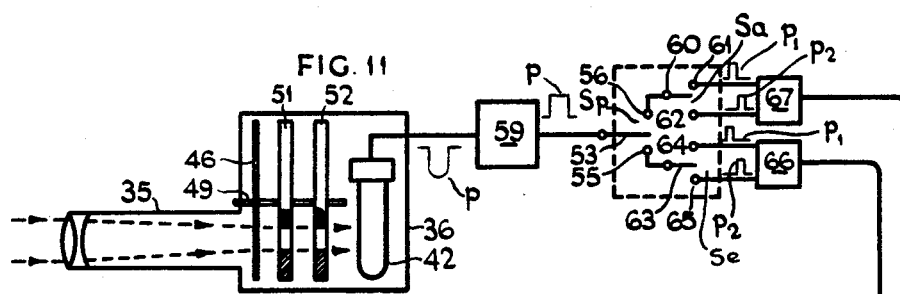
Fig. 11 is a schematic circuit diagram illustrating the operation of the automatic following mechanism.

Referring now in more detail in Figs. 11-17, the output pulse P (Fig. 12) from the photocell 42 is fed to a pulse shaping circuit 59 of known design which converts it to a rectangular pulse $p$ (Fig. 13) of constant height. This pulse $p$ is fed to the moving contact blade 53 of the changeover switch $Sp$. This switch is set by the cam 51 between successive scans of a slit 47 or 48 across the telescope aperture 41 to route the pulse $p$ to the moving contact blade 60 or 63 of the appropriate change over switch $Sa$ or $Se$, see Figs. 10 and 11. Thus, if the slit 47 is about to scan the aperture 41, the output from the photocell 42 is required to be utilised for correcting any deviation of the telescope axis in elevation, and the contacts 53a, 55a of the change-over switch $Sp$ are made by the cam 51 in advance of the scanning operation so that the circuit is made to the moving contact 63 of the change-over switch $Se$. When the slit 47 commences its scanning operation, the contacts 63, 64 of the switch $Se$ are made, and the shaped output pulse $p$ begins to be fed to an elevation comparison unit 66 (Fig. 11). When the slit 47 crosses the axis of the telescope 35, the contact blade 63 is moved by the cam lift 52a to break the circuit with the blade 64 and make the circuit with the blade 65 (see Fig. 11). The remainder of the shaped pulse $p$ is then fed to the other side of the comparison unit 66. It will thus be seen that the switch $Se$ chops the pulse $p$ into two pulses $p_1$ and $p_2$ (Figs. 14 and 16) which, if the telescope is correctly aligned in elevation, are of equal width, and since there is no difference between the two inputs to the comparison circuit 66, no signal is fed to the elevation servo-motor $Me$.

A similar sequence of events occurs when the slit 48 scans the aperture 41 in azimuth, the switch $Sp$ being previously operated by the cam 51 to its other position and the contact 60 of the switch $Sa$ being moved from the contact 61 to the contact 62 as the slit crosses the telescope axis to feed pulses $p_1$ and $p_2$ to the azimuth comparison unit 67 controlling the azimuth servo-motor $Ma$.

Figure 15:
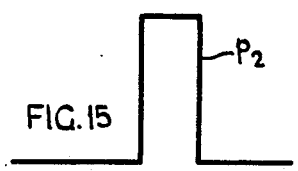
Figure 17:
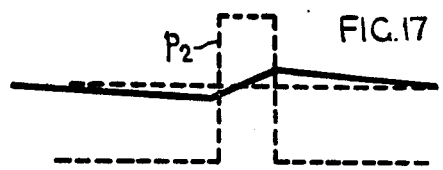

Each comparison unit 66, 67 consists essentially of two leaky condensers which are charged during the occurrence of a respective pulse $p_1$ or $p_2$ in the input (see Figs. 15 and 17). The circuit is arranged so that, if the two pulses $p_1$ and $p_2$ are of equal length, the mean voltage V on each condenser is constant, these voltages being equal. If, however, one pulse $p_1$ is longer than the other pulse $p_2$, the condensers are unequally charged, and the mean voltage of the one condenser will rise while the mean voltage on the other will fall, the difference being proportional to the difference in widths of the two pulses and hence to the error in alignment of the telescope 35. A difference voltage is then fed to the respective servo-motor $Ma$ or $Me$ to correct the position of the telescope.

In the use of the equipment for making an aerial geomagnetic survey, the fluxgates 10, 10a are first energised, and any desired value of constant current is injected into the associated feedback coils 20. The level of feedback from the amplifier 14 is also adjusted to suit the sensitivity requirements for the survey to be made. Each separate fluxgate and amplifier unit is then tested for any inherent unbalance which may give rise to a false signal. In the first test, the reversing switch 7 (Figs. 5 and 6) is first closed in one direction and, with the fluxgates 10 in zero ambient field, the output from the bridge is observed. The switch 7 is thrown over, and the output again observed. If it is not identical, the error is in the oscillator 5 and the necessary adjustments are made until the outputs are identical.

When this has been achieved, the same procedure is adopted in respect of the ganged reversing switches 12 and 18, any inequalities observable between the two outputs from the amplifier 14 being due to unbalance in the amplifier circuit, and adjustments being made accordingly.

When these tests have been completed, in respect of both the total force magnetometer and the two field component magnetometers, the equipment is standardised, and its measurements will be in absolute values. It will thus be seen that the invention provides an equipment which can be easily checked and adjusted as desired, and the results obtained are absolute, as opposed to relative, values.

Figure 4:
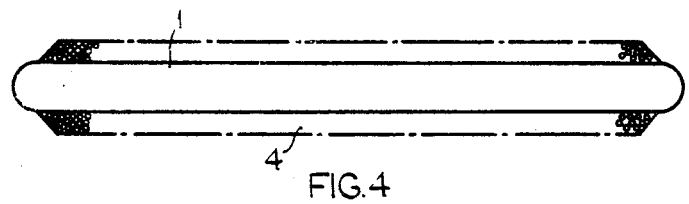

The device (not illustrated) for measuring the vertical component of the earth's magnetic field comprises a fluxgate assembly having two parallel rigidly connected fluxgates constructed as shown in Fig. 4, and which is mechanically coupled to a pendulum so that, when the pendulum hangs freely the magnetic axis of the fluxgate assembly is vertical. The pendulum is suspended by a known form of universal suspension comprising an upper bar secured to the aircraft structure and having fixed at its opposite ends short depending flexible strips whose lower ends are secured to the outer ends of one pair of arms of a rigid rectangular cruciform member, the outer ends of the other pair of arms of which have similar depending strips fixed thereto whose lower ends support a lower bar directed at right angles to the upper bar. From the centre point of this lower bar is suspended the pendulum rod which carries the fluxgate. The whole assembly may be fluid-damped.

The vertical component fluxgate assembly may also be replaced by another telescopically-controlled assembly, the telescope of which is trained on another heavenly body, and it will be understood that any convenient arrangement for detecting deviations from the correct alignment of the telescope may be adopted according to preference or the prevailing physical or other relevant conditions.

What we claim is:

1. Apparatus for use in determining the earth's magnetic field in magnitude and direction comprising means for making simultaneous and continuous measurements on a moving vehicle of the magnitude of the total force of the field and of two components thereof in different known directions, at least one of which is the direction of a preselected heavenly body from the vehicle, and means for simultaneously and continuously recording the time and the position of the vehicle with respect to the earth's surface.

2. Apparatus according to claim 1 comprising in combination a magnetometric device for measuring the earth's total magnetic field, a second magnetometric device for measuring a component thereof in a predetermined direction, a third magnetometric device, and means for maintaining the orientation of the third magnetometric device in the direction of a preselected heavenly body.

3. Apparatus according to claim 2 wherein the means for maintaining the orientation of the third magnetometric device comprises a telescope to be trained on the preselected heavenly body, light sensitive means responsive to departures of the axis of the telescope from the direction of the heavenly body for correcting deviations of the telescope from the required direction, and means for controlling the orientation of the third magnetometric device in accordance with movements of the telescope.

4. Apparatus according to claim 3 wherein the light sensitive means comprises a photocell located on the telescope axis and arranged to receive light rays passing therethrough, means for interrupting the said rays before they impinge on the photocell, and servo-mechanism coupled to the telescope and controlled by the photocell in the sense for maintaining the alignment of the telescope correct.

5. Apparatus according to claim 4 wherein the light interrupting means comprises an opaque shutter having a pair of slits formed therein, means for traversing the slits alternately across the telescope aperture transversely of their lengths in two directions at right angles, means for splitting the photocell output as each slit crosses the telescope axis, and means for comparing the two parts of the photocell output and for deriving a control voltage proportional to any difference between the said two parts.

6. In the measurement of the earth's magnetic field, measuring the total force thereof, the field strength in the direction of a heavenly body, the field strength in another fixed direction, and simultaneously determining the time and geographical position at which the said measurements are made.

7. In the measurment of the earth's magnetic field, measuring the total force thereof, the field strength in the direction of a first heavenly body, the field strength in the direction of a second heavenly body and simultaneously determining the time and geographical position at which the said measurements are made.

8. In determining the earth's magnetic field in magnitude and direction at any given point of fixed geographical location of the earth's surface, measuring the total force thereof at that point and the field strength in the direction of a heavenly body, determining the time of such measurement, and then measuring the field strength at the same point in the direction of the said heavenly body at a different time.

ALAN WEST BREWER.
CHARLES ALFRED JARMAN.

REFERENCES CITED

The following references are of record in the file of this patent:

UNITED STATES PATENTS

| Number | Name | Date |
|---|---|---|
| 2,047,609 | Antranikian | July 14, 1936 |
| 2,427,666 | Felch | Sept. 23, 1947 |
| 2,468,968 | Felch | May 3, 1949 |
| 2,476,273 | Beach | July 19, 1949 |
| 2,477,337 | Kahl | July 26, 1949 |
| 2,485,847 | Schmidt | Oct. 25, 1949 |

OTHER REFERENCES

"Transactions, American Geophysical Union," vol. 30, No. 6, Dec. 1949, pp. 836–849.

"Geophysics," vol. XV, No. 1, Jan. 1950, pp. 102–109.